US012031193B2

(12) United States Patent
Kapralou et al.

(10) Patent No.: US 12,031,193 B2
(45) Date of Patent: Jul. 9, 2024

(54) MINERAL TREATMENT PROCESS

(71) Applicant: IMERTECH SAS, Paris (FR)

(72) Inventors: Christina Kapralou, Kifisia (GR); Thanasis Karalis, Kifisia (GR); Christos Dedeloudis, Kifisia (GR); Konstantinos Karanasios, Kifisia (GR)

(73) Assignee: ImerTech SAS, Paris (FR)

( * ) Notice: Subject to any disclaimer, the term of this patent is extended or adjusted under 35 U.S.C. 154(b) by 337 days.

(21) Appl. No.: 15/733,290

(22) PCT Filed: Nov. 30, 2018

(86) PCT No.: PCT/EP2018/083226
§ 371 (c)(1),
(2) Date: Jun. 22, 2020

(87) PCT Pub. No.: WO2019/120951
PCT Pub. Date: Jun. 27, 2019

(65) Prior Publication Data
US 2020/0318216 A1 Oct. 8, 2020

(30) Foreign Application Priority Data
Dec. 22, 2017 (EP) .................... 17386051

(51) Int. Cl.
C22B 1/24 (2006.01)
C01B 33/40 (2006.01)
C22B 1/243 (2006.01)
C22B 1/244 (2006.01)

(52) U.S. Cl.
CPC ............ *C22B 1/2406* (2013.01); *C01B 33/40* (2013.01); *C22B 1/243* (2013.01); *C22B 1/244* (2013.01)

(58) Field of Classification Search
CPC .................................. C22B 1/2406
See application file for complete search history.

(56) References Cited

U.S. PATENT DOCUMENTS

| 4,057,605 A * | 11/1977 | Chauvin | C04B 18/027 264/117 |
| 4,863,512 A * | 9/1989 | Banyai | C22B 1/244 106/175.1 |
| 5,188,064 A * | 2/1993 | House | A01K 1/0154 119/172 |
| 5,452,684 A * | 9/1995 | Elazier-Davis | A01K 1/0155 119/173 |
| 5,476,532 A * | 12/1995 | Steeghs | C21B 13/00 75/322 |
| 5,707,912 A * | 1/1998 | Lowe | C09C 1/42 106/486 |
| 9,175,363 B2 * | 11/2015 | Günther | C22B 1/205 |
| 2002/0035188 A1 * | 3/2002 | Steeghs | C22B 1/243 524/424 |
| 2002/0155955 A1 * | 10/2002 | Kato | A01N 25/34 504/367 |
| 2007/0221099 A1 * | 9/2007 | Mintz | C04B 40/065 106/695 |
| 2010/0107929 A1 * | 5/2010 | Gay | C09C 1/42 425/222 |
| 2014/0190310 A1 * | 7/2014 | Tooge | C22B 1/243 75/319 |
| 2016/0346981 A1 * | 12/2016 | Lipscomb | B29C 48/04 |

FOREIGN PATENT DOCUMENTS

| CN | 1528809 A | 9/2004 | |
| CN | 103748241 A | 4/2014 | |
| CN | 104805279 A | 7/2015 | |
| CN | 105087912 A | 11/2015 | |
| CN | 107208174 A | 9/2017 | |
| EP | 0413592 A1 | 2/1991 | |
| JP | 2003155525 A * | 5/2003 | .......... C22B 1/2406 |
| RU | 25244 U1 | 9/2002 | |
| RU | 2542186 C1 | 2/2015 | |
| RU | 2604546 C2 | 2/2016 | |
| SU | 899690 A1 | 1/1982 | |
| SU | 1556544 A3 | 5/1985 | |
| WO | WO-2013-010629 A1 | 1/2013 | |
| WO | WO-2013010629 A1 * | 1/2013 | ............ C22B 1/242 |
| WO | WO-2016-049465 A1 | 3/2016 | |
| WO | WO-2016049465 A1 * | 3/2016 | ............... C21B 3/02 |

OTHER PUBLICATIONS

Hosotani et al. JP-2003155525—A translation. May 2003 (Year: 2003).*
International Search Report and Written Opinion dated Dec. 19, 2018, in International Application No. PCT/EP2018/083226.
Liu, Hao et al., "Effect of Bentonite on the Pelleting Properties of Iron Concentrate," Hindawi, Journal of Chemistry, vol. 2017, Article ID 7639326, 6 pages; https://doi.org/10.1155/2017/7639326.
English Translation of Ukrainian Office Action. Received May 23, 2023. 6 pages.

* cited by examiner

*Primary Examiner* — Cachet I Proctor
(74) *Attorney, Agent, or Firm* — Finnegan, Henderson Farabow, Garrett & Dunner, LLP

(57) ABSTRACT

Use of a smectite clay that has been pre-treated with a dispersant as a binder, in particular the use of a smectite clay that has been pre-treated with a dispersant as a binder to form iron ore pellets.

15 Claims, No Drawings

MINERAL TREATMENT PROCESS

CLAIM FOR PRIORITY

This application is a U.S. national phase entry under 35 U.S.C. § 371 from PCT International Application No. PCT/EP2018/083226, filed Nov. 30, 2018, which claims the benefit of priority of European Patent Application No. 1738605.1, filed Dec. 22, 2017, from both of which this application claims priority and both of which are incorporated herein by reference.

TECHNICAL FIELD

The present invention relates generally to the use of a smectite clay that has been pre-treated with a dispersant as a binder. In particular, the present invention relates to the use of a smectite clay that has been pre-treated with a dispersant as a binder to form iron ore pellets. The present invention also relates to methods of treating a smectite clay with a dispersant and methods of making pellets, for example iron ore pellets. The present invention further relates to the treated smectite clays and compositions for forming pellets, including the pellets themselves.

BACKGROUND

Iron ore is the main raw material used in pig iron production and steelmaking. Iron ore may be fed with limestone and coke in blast furnaces to produce pig iron, which is fed to basic oxygen furnaces to produce steel. Alternatively, iron ore may be used with iron scrap to produce raw iron pellets and briquettes. Iron pellets and briquettes can then be fed to direct-reduction reactors such as electric arc furnaces to produce steel. In direct-reduction technology, it is important that high quality iron ore is used because direct-reduction processes do not form a liquid slag in the same way as blast furnace processes, and impurities (gangue) are concentrated rather than removed. Thus, direct-reduction processes have strict specifications in terms of contaminants such as silica, alumina, phosphorus and sulphur in the pellet feed. The contaminants may, for example, come from the binder used to make the iron ore pellets. For example, the contaminants may come from a bentonite binder used to make the iron ore pellets. It is therefore desirable to provide alternative and/or improved binders for making iron ore pellets. An improvement in binder properties may, for example, allow a reduced amount of binder to be used to form iron ore pellets, leading to reduced cost. Therefore, it may be advantageous to use the improved binder to make iron ore pellets for both the direct-reduction and blast furnace processes. Further, it may be advantageous to use the alternative and/or improved binder for other uses, for example in pelletization of other pellet-forming particles.

SUMMARY

In accordance with a first aspect of the present invention there is provided a use of a smectite clay that has been pre-treated with a dispersant as a binder.

In accordance with a second aspect of the present invention there is provided a method of pelletization, the method comprising treating a smectite clay with a dispersant and combining the treated smectite clay with pellet-forming particles to form pellets.

In accordance with a third aspect of the present invention there is provided the pellets obtained by and/or obtainable by a method or use according to any aspect of the present invention, including all embodiments thereof.

In accordance with a fourth aspect of the present invention there is provided iron ore pellets obtained by and/or obtainable by a method or use according to any aspect of the present invention, including all embodiments thereof.

In accordance with a fifth aspect of the present invention there is provided a use of the iron ore pellets in accordance with any aspect or embodiment of the present invention or disclosed herein for the production of direct reduced iron or pig iron. The direct reduced iron or pig iron may then, for example, be used to make steel.

In accordance with a sixth aspect of the present invention there is provided a composition for making pellets, the composition comprising a smectite clay that has been pre-treated with a dispersant and pellet-forming particles. In certain embodiments, the composition is for making iron ore pellets and the pellet-forming particles are iron ore particles.

In accordance with a seventh aspect of the present invention there is provided a smectite clay that has been pre-treated with a dispersant. In certain embodiments, the smectite clay can provide a green strength and/or green drop number that is at least about 10% greater than the respective green strength and/or green drop number obtained with the smectite clay prior to treatment with the dispersant. Alternatively or additionally, in certain embodiments, the smectite clay has a dispersion volume that is at least about 5% greater than the dispersion volume of the smectite clay prior to treatment with the dispersant.

In certain embodiments of any aspect of the present invention, the smectite clay is bentonite.

In certain embodiments of any aspect of the present invention, the dispersant is a sodium-phosphate type dispersant such as sodium hexametaphosphate.

In certain embodiments of any aspect of the present invention, the dispersant is an acrylamide-type dispersant.

In certain embodiments, the dispersant is used in an amount equal to or less than about 5 wt % to pre-treat the smectite clay. In certain embodiments, the dispersant is used in an amount equal to or less than about 1 wt % to pre-treat the smectite clay.

Certain embodiments of any aspect of the present invention may provide one or more of the following advantages:
  Improved green strength properties (e.g. green strength and green drop number) compared to untreated smectite clay;
  Similar dry strength properties compared to untreated smectite clay;
  Use of reduced amount of smectite clay as binder;
  Reduced amount of contaminants (e.g. silica, alumina, sulphur, phosphorus);
  Increased volume of binder;
  Reduced binder viscosity;
  Easily dispersed;
  Easily hardened
  Resistance to high temperatures;
  Useful in saline environments.

The details, examples and preferences provided in relation to any particulate one or more of the stated aspects of the present invention will be further described herein and apply equally to all aspects of the present invention. Any combination of the embodiments, examples and preferences described herein in all possible variations thereof is encompassed by the present invention unless otherwise indicated herein, or otherwise clearly contradicted by context.

DETAILED DESCRIPTION

The present inventors have surprisingly and advantageously found that pre-treating smectite clay with a dispersant improves its ability to act as a binder in various applications such as pelletization, for example to form iron ore pellets. "Pre-treatment" of a smectite clay with a dispersant refers to any treatment of the smectite clay with a dispersant before the application of the smectite clay as a binder, for example before the smectite clay is combined with pellet-forming particles such as iron ore particles to form pellets.

There is therefore provided herein a use of a smectite clay that has been pre-treated with a dispersant as a binder. There is also provided herein a method of pelletization, the method comprising treating a smectite clay with a binder and then combining the treated smectite clay with pellet-forming particles to form pellets. There is also provided herein a method of treating a smectite clay with a dispersant.

The term "binder" refers to any material that holds other material together and thus increases the agglomeration of the other material.

The term "smectite clay" used herein refers to a material that comprises a clay having a smectite mineral structure, namely a 2:1 structure of an octahedral sheet sandwiched between two tetrahedral sheets. Smectite clays have a variable net negative charge, which may, for example, be balanced by sodium, potassium, aluminium, calcium or magnesium ions or by hydrogen adsorbed externally on interlamellar surfaces. The cations present in smectite clays are generally exchangeable. Generally, smectite clays have a high cation exchange capacity. The smectite clays used herein may, for example, comprise one or more of these cations.

For example, the smectite clay may comprise, consist essentially of or consist of montmorillonite, beidellite, nontronite, saponite, hectorite or a combination of one or more thereof. In certain embodiments, the smectite clay comprises, consists essentially of or consists of montmorillonite. Bentonite is a smectite clay comprising mostly montmorillonite. Therefore, in certain embodiments, the smectite clay comprises, consists essentially of or consists of bentonite. The bentonite may, for example, be potassium bentonite, sodium bentonite, calcium bentonite, aluminium bentonite, or a combination of one or more thereof. Potassium bentonite, sodium bentonite etc. refer to bentonites wherein the majority of the balancing cations are potassium and sodium respectively. Potassium bentonite and sodium bentonite etc. may therefore also comprise other balancing cations in addition to the respective potassium or sodium cations. In certain embodiments, the smectite clay comprises, consists essentially of or consists of sodium bentonite. Sodium bentonite includes naturally occurring sodium bentonite and sodium bentonite formed by replacing cations such as calcium, potassium or aluminium in naturally occurring bentonite with sodium cations, for example by soda ash activation. This may be referred to as sodium-activated bentonite. Soda ash activation may, for example, comprise addition of soda ash powder (sodium carbonate) to bentonite having a moisture content of at least about 20 wt %, for example at least about 22 wt % or at least about 35 wt %, and mixing by, for example, by extrusion or kneading. The bentonite may then be dried and milled to a powder having a desired particle size distribution.

When the smectite clay used in certain embodiments of the present invention is obtained from naturally occurring sources, it may be that some mineral impurities will inevitably contaminate the ground material. In general, however, the smectite clay will contain less than 5% by weight, preferably less than 1% by weight of other mineral impurities.

In certain embodiments, the smectite clay comprises at least about 50 wt % smectite mineral structure. For example, the smectite clay may comprise at least about 55 wt % or at least about 60 wt % or at least about 65 wt % or at least bout 70 wt % or at least about 75 wt % or at least about 80 wt % or at least about 85 wt % or at least about 90 wt % or at least about 95 wt % or at least about 96 wt % or at least about 97 wt % or at least about 98 wt % or at least about 99 wt % smectite mineral structure. For example, the smectite clay may comprise up to about 100 wt % smectite mineral structure. For example, the smectite clay may comprise up to about 99 wt % or up to about 98 wt % or up to about 97 wt % or up to about 95 wt % or up to about 90 wt % smectite mineral structure. This may, for example, be determined using the Rietveld method (using an X-ray diffractor (e.g. Seifert Analytical X-ray version 2.8, Eigenmann GmbH) and the Rietveld software "Autoquan".

The smectite clay may, for example, comprise equal to or less than about 40 wt % moisture. For example, the smectite clay may comprise equal to or less than about 35 wt % or equal to or less than about 30 wt % or equal to or less than about 25 wt % or equal to or less than about 20 wt % or equal to or less than about 15 wt % moisture. Moisture content may, for example, be measured by heating the smectite clay until there is no further change in weight and comparing the weight before and after heating. The smectite clay may, for example, comprise equal to or greater than about 0 wt % moisture. For example, the smectite clay may comprise equal to or greater than about 5 wt % or equal to or greater than about 8 wt % or equal to or greater than about 10 wt % or equal to or greater than about 12 wt % or equal to or greater than about 15 wt % moisture. For example, the smectite clay may have a moisture content ranging from about 0 wt % to about 40 wt % or from about 5 wt % to about 40 wt % or from about 8 wt % to about 40 wt % or from about 8 wt % to about 35 wt % or from about 8 wt % to about 30 wt % or from about 8 wt % to about 25 wt % or from about 8 wt % to about 20 wt % or from about 8 wt % to about 15 wt %. In particular, the smectite may have a moisture content within this range during pre-treatment with the dispersant. After treatment with the dispersant the treated smectite clay may be combined with water and the particles to be bound together for its use as a binder, for example to make pellets. The treated smectite clay (i.e. the smectite clay that has been pre-treated with a dispersant) may therefore have a moisture content outside this range.

The smectite clay (e.g. bentonite) may, for example, be processed before or after the methods of treatment described herein in order to obtain a desired particle size. The smectite clay to be treated may, for example, have a particle size equal to or less than about 55 mm or equal to or less than about 51 mm or equal to or less than about 50 mm or equal to or less than about 45 mm or equal to or less than about 40 mm or equal to or less than about 35 mm. The smectite clay to be treated may, for example, have a particle size equal to or greater than about 75 µm or equal to or greater than about 100 µm or equal to or greater than about 125 µm or equal to or greater than about 150 µm. Processing may, for example, comprise grinding, milling and/or sieving.

The smectite clay may, for example, be used in an amount ranging from about 0.2 to about 1.0 kg of smectite clay per MT (mega-tonne) of pellet-forming particles (e.g. iron ore). For example, the smectite clay may be used in an amount ranging from about 0.4 to about 0.8 or from about 0.4 to about 0.7 kg of smectite clay per MT of pellet-forming particles (e.g. iron ore).

The term "dispersant" refers to a substance that is increases the separation of a material. The dispersant may, for example, be any dispersant suitable to enhance separation of the particles of the smectite clay. Without wishing to be bound by theory, it is thought that the dispersant promotes detachment of platelets of the smectite clay (e.g. bentonite) to create "ladders", increases water uptake between the platelets thus creating a higher volume of binder, and reduces the viscosity of the binder. This results in a higher number of "ladders" and increased volume of material to bind to the pellet-forming particles to be bound together and also means that it is easier to spread the binder amongst the pellet-forming particles. The presence of a dispersant in the system during pelletization may also enhance the dispersion and thus enhance the total surface area of the pellet-forming particles to be bound together.

The dispersant may, for example, be an inorganic or organic dispersant.

In certain embodiments, the dispersant is a phosphate-type dispersant (a dispersant including phosphate ($PO_4^{3-}$) salt). For example, the dispersant may be a condensed phosphate-type salt. For example, the dispersant may be a hexametaphosphate salt, a pyrophosphate salt or a tripolyphosphate salt. The phosphate salt may, for example, be a metal phosphate (e.g. alkali earth metal or alkali metal) salt or may be an ammonium phosphate salt. For example, the phosphate salt may be a potassium phosphate salt. Condensed phosphate salts may, for example, be stabilized by adding an amino trimethyl phosphonic acid or water-soluble alkali metal salt thereof, as described in U.S. Pat. No. 3,341,340, the contents of which are incorporated herein by reference. In certain embodiments, the dispersant is a sodium phosphate-type dispersant (a dispersant including a salt of sodium ($Na^+$) and phosphate ($PO4^{3-}$). For example, the dispersant may be sodium hexametaphosphate, sodium tripolyphosphate, trisodium phosphate, sodium pyrophosphate, tetrasodium pyrophosphate or a combination of one or more thereof. The phosphate-type (e.g. sodium phosphate-type) dispersant may or may not be a hydrate. The present invention may tend to be discussed in terms of sodium hexametaphosphate, but should not be construed as being limited as such.

In certain embodiments, the dispersant is a synthetic polymer. The dispersant may, for example, be a condensation product of at least one aldehyde and at least one compound containing two or more $NH_2$ groups. The compound containing at least two NH2 groups may be $H_2N-X-NH_2$, wherein X is an aliphatic, straight chain, branched or cyclic residue containing 1 to 10 carbon atoms which may also contain oxygen or nitrogen atoms, such as urea, 1,6-hexandiamin, diethylene triamine, 1,2-cyclohexanediamine. Alternatively, X may be an aromatic residue containing 1 to 10 carbon atoms which may also contain oxygen or nitrogen atoms. X may contain one or more amino groups, such as melamine, 1,2-diaminobenzene, 1,8-diaminonaphthalene.

The dispersant may, for example, be a copolymer obtained via a radical reaction of an unsaturated monomer with an actylic acid derivative. The unsaturated monomer may be represented by the formula:

wherein Y is hydrogen, OH or a residue containing 1 to 10 carbon atoms and at least one oxygen atom, one nitrogen atom or one aromatic moiety. For example, Y may be selected from residues of the formula —OR wherein R means H, —C(═O)H, —C(═O)CH₃, C(═O)CH₂CH₃, C(═O)CH₂CH₂CH₃, C(═O)CH(CH₃)₂, C(═O)C(CH₃)₃. Examples for such compounds are vinylalcohol, vinylacetate, and vinylformiate. Alternatively, if Y is a nitrogen containing residue, examples for such compounds are vinylpyrrolidone and dimethyldiallylammoniumchloride. In case that Y contains an aromatic moiety, the compound may be styrene. In case of Y═OH the monomer unit is preferably made by saponification.

The acrylic acid derivative preferably is represented by the formula:

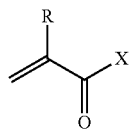

wherein R is H or $CH_3$ and X is OH, $NH_2$, OR', NHR", NR'"R"", R'—R"" being independently from each other aliphatic hydrocarbon groups having 1 to 6 carbon atoms. Examples for such compounds are acrylic acid, methacrylic acid, acrylamide, methacrylamide, N, N-dimethylacrylamide, N, N-dimethylmethacrylamide, ammonium acryloyldimethyltaurate.

The dispersant may, for example, be a maleic acid-acrylic acid and maleic acid-methacrylic acid copolymer.

The dispersant may, for example, be a homopolymer obtained by radical polymerization of an olefinically unsaturated monomer comprising at least one carboxylic group. The monomer preferably comprises 3 to 10 carbon atoms.

Examples for such compounds are the homopolymers of acrylic acid, methacrylic acid, vinyl acetate, vinylformiate, vinylpropionate, maleic acid, maleic acid anhydride, fumaric acid.

The synthetic polymer is preferably selected from the group consisting of melamine-urea-formaldehyde resin, urea-formaldehyde resin, melamine-formaldehyde resin, melamine-glyoxal-formaldehyde resin, styrene-acrylic copolymer, vinyl-acrylic copolymer, vinyl acetate-acrylic copolymer, vinyl acetate polymer, poly (maleic anhydride), acrylic-maleic copolymer, diallyl dimethyl ammonium chloride-acrylamide copolymer, polycarboxylate, sodium salt of poly-naphthalene sulfonic acid, ammonium acryloyldimethyltaurate-vinylpyrrolidone copolymer, Dimethylamine-epichlorohydrin copolymer or mixtures thereof. The synthetic polymer may be added as solid. The synthetic polymer may also be added in solution with any suitable solvent. The preferred solvent is water.

With respect to all aforementioned polymers, their preferred weight average molecular weight is in the range between 500 and 500.000, particularly between 700 and 100.000, especially 800 and 20,000 g/mol, determined by GPC against polystyrene.

In certain embodiments, the dispersant is an acrylamide-type dispersant (a dispersant that comprise acrylamide, such as a polymers including acrylamide). For example, the dispersant may be Floform 3049 ST2 available from SNF group.

The amount of dispersant used to pre-treat the smectite clay may, for example, be equal to or less than about 5 wt % or equal to or less than about 1 wt % based on the total weight of dry smectite clay. For example, the amount of dispersant used to pre-treat the smectite clay may be equal to or less than about 4 wt % or equal to or less than about 3 wt % or equal to or less than about 2 wt % or equal to or less than about 1 wt % or equal to or less than about 0.5 wt % based on the total weight of dry smectite clay. For example, the amount of dispersant used to pre-treat the smectite clay may be equal to or greater than about 0.01 wt % or equal to or greater than about 0.05 wt % or equal to or greater than about 0.1 wt % based on the total weight of dry smectite clay. Where a sodium-phosphate type dispersant is used (e.g. sodium hexametaphosphate), the amount of dispersant used to pre-treat the smectite clay may be equal to or less than about 1 wt %, for example equal to or less than about 0.5 wt %. The smectite clay may or may not be in dry form when it is treated with the dispersant.

The smectite clay may, for example, be treated with the dispersant by contacting the smectite clay and the dispersant. For example, the smectite clay and the dispersant may be mixed to form the treated smectite clay. The smectite clay, dispersant and any other optional additives may, for example, be in any form, for example dry powders or in suspension or solution. For example, the smectite clay, dispersant and any other optional additives may be mixed in a semi-dry form such as a viscous slurry. The mixing of the smectite clay, dispersant and any other optional additives may be carried out using a mix-muller batch mixer, a Loedige mixer, a screw mixer, an extruder, a kneader, a shredder, a gravimetric feeder or a grader. In certain embodiments, the dispersant and smectite clay are contacted during milling of the smectite clay. In certain embodiments, a liquid composition comprising the dispersant (e.g. a mixture of the dispersant and water) is applied to the smectite clay, for example by spraying, for example using nozzles or any other appropriate device. The smectite clay may then be dried.

The pre-treatment of the smectite clay with the dispersant may take place at any time before the smectite clay is used as a binder. For example, the pre-treatment of the smectite clay with the dispersant may take place after mining, and/or prior to, simultaneously or after sodium-activation, and/or prior to, during or after milling. The pre-treatment of the smectite clay with the dispersant may take place at any point during the processing of the smectite clay (from processing through to product delivery). For example, the pre-treatment of the smectite clay with the dispersant may take place during transportation, during big-bag filling or during loading of a container.

In certain embodiments, the dispersant is contacted with the smectite clay during sodium-activation of the smectite clay (e.g. sodium activation using soda ash). This may comprise addition of soda ash powder (sodium carbonate) and the dispersant to bentonite and mixing, for example by extrusion or kneading, optionally followed by drying and/or milling. The smectite clay may, for example, have a moisture content of at least about 20 wt %, for example at least about 22 wt % or at least about 35 wt %.

There is also provided herein treated smectite clay that may, for example, be obtained by and/or obtainable by a method described herein.

The treated smectite clay may, for example, have a dispersion volume that is at least about 5% greater than the dispersion volume of the smectite clay prior to treatment with the dispersant. For example, the treated smectite clay may have a dispersion volume that is at least about 6% or at least about 7% or at least about 8% or at least about 9% or at least about 10% or at least about 11% or at least about 12% or at least about 13% or at least about 14% or at least about 15% greater than the dispersion volume of the smectite clay prior to treatment with the dispersant. For example, the treated smectite clay may have a dispersion volume that is up to about 50% or up to about 45% or up to about 40% or up to about 35% or up to about 30% or up to about 25% or up to about 20% greater than the dispersion volume of the smectite clay prior to treatment with the dispersant. The dispersion volume of the smectite clay may be measured using the sedimentation test as described in S. Atkther, J. Hwang and H. Lee, "Sedimentation Characteristics of Two Commercial Bentonites in Aqueous Suspensions", Clay Minerals (2008), 43, pages 449-557, the contents of which are incorporated herein by reference.

The treated smectite clay may, for example, provide a green strength and/or green drop number that is at least about 10% greater than the respective green strength and/or green drop number obtained using the smectite clay prior to treatment with the dispersant. For example, the treated smectite clay may provide a green strength and/or green drop number that is at least about 15% or at least about 20% or at least about 25% or at least about 30% or at least about 35% or at least about 40% greater than the respective green strength and/or green drop number obtained using the smectite clay prior to treatment with the dispersant. The green strength and/or green drop number is measured as described below in relation to iron ore pellets.

The treated smectite clay may, for example, provide a dry strength that no more than about 25% less, for example no more than about 20% less or no more than about 15% less or no more than about 10% less or no more than about 5% less than the dry strength obtained using the smectite clay prior to treatment with the dispersant. The dry strength is measured as described below in relation to iron ore pellets.

The treated smectite clays described herein may be used as a binder. The binder may, for example, be used in foundry molds or be used for the agglomerization of mineral particles.

The treated smectite clays may also be used for any other known use of smectite clays that has not been treated. For example, the treated smectite clays may be used as adhesives, for example in paper products, in cements, for example for floor coverings, in animal feed, ceramics, cosmetics, detergents, as emulsion stabilizers, as food additives, in paper, sealants, in water clarification.

For example, the treated smectite clays may be used as a binder to form pellets. The term "pellet" as used herein refers to an aggregate of smaller particles that have been held together. The pellets described herein may, for example, have a spherical or non-spherical shape. For example, the pellets may have a size within the range of about 5 mm to about 20 mm. The pellets may, for example, be mineral pellets, food pellets, pharmaceutical pellets or animal feed pellets.

For example, the treated smectite clays described herein may be used as a binder to form mineral ore pellets such as iron ore pellets. The iron ore pellets may, for example, be used to produce direct reduction iron or pig iron. Thus, the iron ore pellets may be direct reduction pellets or blast furnace pellets. The iron ore used to make iron ore pellets may, for example, be hematite, magnetite, goethite, limonite, siderite, taconite, itabirite or a combination of one or more thereof.

The pellets may be made by any suitable pelletization process. Typically, the pellet-forming particles (particles of the main component of the pellets) are mixed with the binder and any other optional additives and then shaping the mixed material into a pellet shape, for example using a pelletizing machine such as a drum or a pelletizing disk. The pellets may then be treated, for example be a thermal treatment, to harden the pellets and/or to enable them to keep their shape.

Thus, there is also provided herein pellets (e.g. iron ore pellets) comprising the treated smectite clay described herein, for example pellets obtained by and/or obtainable by a method described herein.

In addition to the pellet-forming particles (e.g. mineral ore such as iron ore particles) and the binder, the pellets may include one or more further additives. The further additives may, for example, be one or more of coke, limestone/lime, dolomite/magnesia and olivine. For example, the pellets may comprise one or more further binders. The one or more further binder may be selected from bentonite (e.g. ultrafine bentonite), gypsum, lime such as hydrated lime, limestone, magnesite, magnesia, magnesium hydroxide, kaolin (e.g. high aspect ratio kaolin), talc (e.g. high aspect ratio talc), fibres, polyacrylamides, polyacrylates, starch, guar gum, dextrin, sodium lignosulfonates, sodium silicate, potassium silicate, lithium silicate, cement, geopolymers and resins (e.g. epoxy resin, acrylic resin). Ultrafine bentonite refers to bentonite that has a maximum particle size of 45 µm measured by thelaser particle diffraction method. High aspect ratio refers to minerals having an aspect ratio equal to or greater than about 7. In certain embodiments, the pellets or the composition for making pellets does not comprise an organic binder.

The aspect ratio of the smectite clay refers to the lamellarity index, which is defined by the following ratio:

$$\frac{d_{mean} - d_{50}}{d_{50}}$$

in which "$d_{mean}$" is the value of the mean particle size ($d_{50}$) obtained by a particle size measurement by wet Malvern laser scattering (standard AFNOR NFX11-666 or ISO 13329-1) and "$d_{50}$" is the value of the median diameter obtained by sedimentation using a sedigraph (standard AFNOR X11-683 or ISO 13317-3). Reference may be made to the article by G. Baudet and J. P. Rona, Ind. Min. Mines et Carr. Les techn. June, July 1990, pp 55-61, which shows that this index is correlated to the mean ratio of the largest dimension of the particle to its smallest dimension.

The one or more further additives may each be present in the pellets or composition for forming pellets in an amount equal to or less than about 50 wt % based on the total weight of dry smectite clay. For example, the one or more further additives may each be present in the pellets or composition for forming pellets in an amount equal to or less than about 40 wt % or equal to or less than about 30 wt % or equal to or less than about 20 wt % or equal to or less than about 10 wt % or equal to or less than about 5 wt % or equal to or less than about 1 wt % based on the total weight of dry smectite clay. The one or more further additives may each be present in the pellets or composition for making pellets in an amount equal to or greater than 0 wt % or equal to or greater than 0.5 wt % based on the total weight of dry smectite clay.

The pellets described herein may, for example, comprise equal to or less than about 8 wt % total silica and alumina. For example, the pellets described herein may comprise equal to or less than about 7 wt % or equal to or less than about 6 wt % or equal to or less than about 5 wt % or equal to or less than about 4 wt % or equal to or less than about 3 wt % or equal to or less than about 2 wt % total silica and alumina. For example, where the pellets are direct reduction iron ore pellets, the pellets may comprise equal to or less than about 2 wt % total silica and alumina. For example, the direct reduction iron ore pellets may comprise equal to or less than about 1.5 wt % silica and equal to or less than about 0.5 wt % alumina. Where the pellets are blast furnace pellets, the pellets may comprise equal to or less than about 8 wt % total silica and alumina.

The treated smectite clay may, for example, contribute equal to or less than about 30 wt % of the total silica and alumina in the pellets. For example, the treated smectite clay may contribute equal to or less than about 28 wt % or equal to or less than about 26 wt % or equal to or less than about 25 wt % or equal to or less than about 24 wt % or equal to or less than about 22 wt % or equal to or less than about 20 wt % of the total silica and alumina in the pellets. For example, the treated smectite clay may contribute equal to or greater than about 10 wt % or equal to or greater than about 15 wt % or equal to or greater than about 20 wt % of the total silica and alumina in the pellets.

The pellets (e.g. iron ore pellets) described herein may, for example, have a green strength and/or green drop number that is at least about 10% greater than greater than the respective green strength and/or green drop number of pellets that are identical except the smectite clay was not pre-treated with the dispersant. For example, the pellets described herein may have a green strength and/or green drop number that is at least about 15% or at least about 20% or at least about 25% or at least about 30% or at least about 35% or at least about 40% greater than the respective green strength and/or green drop number of pellets that are identical except the smectite clay was not pre-treated with the dispersant. For example, the pellets described herein may have a green strength and/or green drop number that is up to about 100% greater or up to about 90% greater or up to about 80% greater or up to about 70% greater or up to about 60% greater or up to about 50% greater than the green strength and/or green drop number of pellets that are identical except the smectite clay was not pre-treated with the dispersant.

The pellets (e.g. iron ore pellets) described herein may, for example, have a dry strength that no more than about 25% less, for example no more than about 20% less or no more than about 15% less or no more than about 10% less or no more than about 5% less than the dry strength of pellets that are identical except the smectite clay was not pre-treated with the dispersant.

The green strength, green drop number and dry strength may be measured as follows. Pellets are prepared in batches of 2 kg iron ore concentrate. The smectite clay (in dry powder form) and water are added in the concentrate in order to achieve a moisture content of at least 8.5 wt %. The ingredients are mixed in a mix muller for 1.5 minutes and passed through a shredder. The mixture is formed in pellets using an airplane balling tire of 16" (40.64 cm) diameter, 5" ¼ (13.34 cm) width and rotational speed of 50-52 rpm. A small quantity (approximately 12.5 mL) of pellet seeds (small preformed pellets of diameter 4-5 mm) can be added optionally at the beginning and then the mixture is added gradually in the rotating tire to form pellets. Water is also sprayed concurrently to help the formation of pellets, while the whole procedure lasts for 7 minutes. The formed pellets are sieved and those of the appropriate size—½" (1.27 cm)+¹⁵⁄₃₂" (38.1/81.28 cm) are selected for further evaluation.

Green drop number of the batch is defined by the average of ten pellets right after balling. Each pellet is left to drop from a height of 18" (71.12 cm) on a steel surface until the pellet is cracked or broken. The number of drops until the pellet is cracked or broken represents the green drop number.

Green strength of the batch is defined by the average of 10 pellets right after balling. Green strength is defined in each pellet by using a compression strength machine (e.g. Chatillon, Frank PTI GmbH).

Dry strength of the batch is defined by the average of 10 pellets after drying the pellets in an oven at 105° C. until constant weight (usually overnight). Dry strength is defined in each pellet by using a compression strength machine (e.g. Chatillon, Frank PTI GmbH).

For each batch of pellets the moisture content is defined in 10 pellets (usually those to be measured for dry strength determination) with a method such as ASTM D2216-10 (Standard Test Methods for Laboratory Determination of Water (Moisture) Content of Soil and Rock by Mass).

The Green Drop number, green strength and dry strength for each batch corresponds to a specific moisture content of pellets. Several recipes are prepared at different moisture levels and the properties of pellets at moisture level of 8.5% w.t. is calculated mathematically by interpolation or extrapolation.

EXAMPLES

Example 1: Hematitic Iron Ore Concentrate—Low Absorption Bentonite

A new binder (bentonite NP1) was prepared using a dry powder of soda ash activated bentonite from Milos with a swelling index of 27 mL/2 g and making a blend with 0.1 wt % sodium hexametaphosphate (SHMP) powder. Bentonite NP1 was used to form pellets in a pelletizing rotating tire at an addition level of 6 kg/MT and was compared with pellets formed with the bentonite that has not been treated with the SHMP dispersant at an addition level of 6 kg/MT of iron ore. All comparisons are done at moisture level of 8.5 wt %.

Green drop number (GDN), green strength (GS) and dry strength (DS) were measured as described above. The results are presented in Table 1.

Addition of bentonite NP1 results in an increase of GDN by 23% and GS by 10%, while DS is not affected. The amelioration of green properties allows a reduction of binder consumption by 25% in order to maintain the same green properties that are obtained using only bentonite (i.e. without the SHMP treatment), as shown in results of Table 1 for pellets made using Bentonite NP1 at 4.5 kg/MT of iron ore.

TABLE 1

Green pellet properties of bentonite based binder NP1

| Binder | Addition level on iron ore concentrate | GDN | GS (kgf/pellet) | DS (kgf/pellet) |
|---|---|---|---|---|
| Bentonite | 6 kg/T | 18.2 | 1.44 | 5.35 |
| Bentonite NP1 | 6 kg/T | 22.3 | 1.59 | 5.15 |
| Bentonite NP1 | 4.5 kg/T | 18.0 | 1.52 | 4.23 |

Example 2: Mixed Magnetitic Hematitic Iron Ore Concentrate—Low Absorption Bentonite The new binder (bentonite NP1) was prepared as in Example 1 and was used to form pellets at an addition level of 6 kg/MT. Pellets made using bentonite that had not been treated with SHMP were also prepared for comparison. All comparisons are made on a pellet moisture level of 8.5% w.t.

Green drop number (GDN), green strength (GS) and dry strength (DS) were measured as described above. The results are presented in Table 2.

Use of bentonite NP1 increases GDN by 66% and GS by 20%. When the amount of bentonite NP1 binder was reduced to 4.5 kg/MT of iron ore there is still an increase in green property values. DS is not affected by SHMP addition but deteriorates as binder consumption is reduced.

TABLE 2

Green pellet properties of bentonite based binder NP1

| Binder | Addition level on iron ore concentrate | GDN | GS | DS |
|---|---|---|---|---|
| Bentonite | 6 kg/T | 12.8 | 1.07 | 5.19 |
| Bentonite NP1 | 6 kg/T | 21.2 | 1.28 | 5.59 |
| Bentonite NP1 | 4.5 kg/T | 15.9 | 1.17 | 4.31 |

Example 3: Mixed Magnetitic Hematitic Iron Ore Concentrate—High Absorption Bentonite A new binder (bentonite NP2) was prepared by blending a powder of soda ash activated bentonite from Milos having a swelling index of 42 mL/2 g with 0.1% by weight sodium hexametaphosphate (SHMP) powder. All results were made at moisture level of 8.5 wt %.

Green drop number (GDN), green strength (GS) and dry strength (DS) were measured as described above. The results are presented in Table 3.

Pellets made using bentonite NP2 have a GDN that is almost double than that of pellets made using bentonite that was not treated with SHMP. GS was 16% higher compared to pellets formed using bentonite that was not treated with SHMP, at an addition level of 6 kg/MT. Reducing the binder consumption by 50% down to 3 kg/MT provided pellets with the same level of green properties as when using the double amount of bentonite that had not been treated with SHMP, while DS decreases accordingly to bentonite addition level.

TABLE 3

Green pellet properties of bentonite based binder NP2

| Binder | Addition level on iron ore concentrate | GDN | GS | DS |
|---|---|---|---|---|
| Bentonite | 6 kg/T | 16.1 | 1.19 | 5.9 |
| Bentonite NP2 | 6 kg/T | 29.4 | 1.38 | 5.6 |
| Bentonite NP2 | 3 kg/T | 14.0 | 1.16 | 3.0 |

Example 4: Mixed Magnetitic Hematitic Iron Ore Concentrate—High Absorption Bentonite A new binder (bentonite NP3) was prepared by blending a powder of soda ash activated bentonite from Milos having a swelling index of 42 mL/2 g with 0.1 wt % polyacrylamide solid powder (Floform 3049 ST2 obtained from SNF Group). All comparisons are made at a pellet moisture level of 8.5 wt %. Pellets were prepared using bentonite in an amount of 2.2 kg/MT of iron ore concentrate and their properties were measured (Table 4).

Pellets made by using 6 kg of bentonite that had not been treated with dispersant per MT of iron ore concentrate had equal GDN and GS in comparison with pellets prepared with 2.2 kg/T of bentonite NP3—that is 63% less binder consumption, which accordingly results in reduction of silica and alumina contribution by the binder. Dry strength deteriorates by 37% since the amount of pure bentonite in the binder has been significantly reduced.

TABLE 4

Green pellet properties of bentonite based binder NP3

| Binder | Addition level on iron ore concentrate | GDN | GS | DS |
|---|---|---|---|---|
| Bentonite | 6 kg/T | 16.1 | 1.19 | 5.9 |
| Bentonite NP3 | 2.2 kg/T | 16.5 | 1.17 | 3.7 |

The foregoing broadly describes certain embodiments of the present invention without limitation. Variations and modifications as will be readily apparent to those skilled in the art are intended to be within the scope of the present invention as defined in and by the appended claims.

The following numbered paragraphs may defined particular embodiments of the present invention:

1. Use of a smectite clay that has been pre-treated with a dispersant as a binder.
2. The use of paragraph 1, wherein the smectite clay that has been pre-treated with a dispersant is used as a binder to form pellets.
3. The use of paragraph 1 or 2, wherein the smectite clay that has been pre-treated with a dispersant is used as a binder to form iron ore pellets.
4. The use of any preceding paragraph, wherein the smectite clay comprises bentonite.
5. The use of any preceding paragraph, wherein the smectite clay comprises sodium bentonite such as sodium-activated bentonite or natural sodium bentonite.
6. The use of any preceding paragraph, wherein the smectite clay comprises equal to or less than about 40 wt % moisture.
7. The use of any preceding paragraph, wherein the smectite clay comprises equal to or greater than about 8 wt % moisture.
8. The use of any preceding paragraph, wherein the smectite clay comprises at least about 50 wt % smectite.
9. The use of any preceding paragraph, wherein the smectite clay that has been pre-treated with a dispersant has a dispersion volume that is at least about 5% greater than the dispersion volume of the smectite clay prior to treatment with the dispersant.
10. The use of any preceding paragraph, wherein the dispersant is an inorganic or organic dispersant.
11. The use of any preceding paragraph, wherein the dispersant is a sodium phosphate-type dispersant such as sodium hexametaphosphate, sodium tripolyphosphate, trisodium phosphate and sodium pyrophosphate.
12. The use of any of paragraphs 1 to 10, wherein the dispersant is an acrylamide-type dispersant.
13. The use of any preceding paragraph, wherein the dispersant is used in an amount equal to or less than about 5 wt % based on the total weight of the smectite clay.
14. The use of any preceding paragraph, wherein the smectite clay that has been pre-treated with a dispersant is used in combination with one or more further binders.
15. The use of paragraph 14, wherein the one or more further binders are selected from bentonite (e.g. ultra-fine bentonite), gypsum, lime such as hydrated lime, limestone, magnesite, magnesia, magnesium hydroxide, kaolin (e.g. high aspect ratio kaolin), talc (e.g. high aspect ratio talc), fibres, polyacrylamides, polyacrylates, starch, guar gum, dextrin, sodium lignosulfonates, sodium silicate, potassium silicate, lithium silicate, cement, geopolymers and resins (e.g. epoxy resin, acrylic resin).
16. The use of any preceding paragraph, wherein the smectite clay that has been pre-treated with a dispersant is not used in combination with one or more organic binders.
17. The use of any of paragraphs 3 to 16, wherein the pellets comprise equal to or less than about 8 wt % total silica and alumina, for example equal to or less than about 2 wt % total silica and alumina.
18. The use of any of paragraphs 2 to 17, wherein the smectite clay provides equal to or less than about 30 wt % of the total silica and alumina in the pellet.
19. The use of any of paragraphs 3 to 17, wherein the iron ore pellets have a green strength and/or a green drop number that is at least about 10% greater than the respective green strength and/or green drop number of iron ore pellets that are identical except the smectite clay has not been pre-treated with a dispersant.
20. A method of pelletization, the method comprising:
    treating a smectite clay with a dispersant; and
    combining the treated smectite clay with pellet-forming particles to form pellets.
21. The method of paragraph 20, wherein the pellet-forming particles are iron ore particles and the method is a method of making iron ore pellets.
22. The method of paragraph 20 or 21, wherein the smectite clay comprises bentonite.
23. The method of paragraph 22, wherein the smectite clay comprises a sodium bentonite such as a sodium-activated bentonite or natural sodium bentonite.
24. The method of any of paragraphs 20 to 23, wherein the smectite clay comprises equal to or less than about 40 wt % moisture.
25. The method of any of paragraphs 20 to 24, wherein the smectite clay comprises equal to or greater than about 8 wt % moisture.
26. The method of any of paragraphs 20 to 25, wherein the smectite clay comprises at least about 50 wt % smectite.
27. The method of any of paragraphs 20 to 26, wherein the treated smectite clay has a dispersion volume that is at least about 5% greater than the dispersion volume of the smectite clay prior to treatment with the dispersant.
28. The method of any of paragraphs 20 to 27, wherein the dispersant is an inorganic or organic dispersant.
29. The method of any of paragraphs 20 to 28, wherein the dispersant is a sodium phosphate-type dispersant such as sodium hexametaphosphate, sodium tripolyphosphate, trisodium phosphate and sodium pyrophosphate.
30. The method of any of paragraphs 20 to 28, wherein the dispersant is an acrylamide-type dispersant.
31. The method of any of paragraphs 20 to 30, wherein equal to or less than about 5 wt % of dispersant is used to treat the smectite clay.
32. The method of any of paragraphs 20 to 31, wherein one or more further binders are combined with the treated smectite clay and pellet-forming particles to form pellets.
33. The method of paragraph 32, wherein the one or more further binders are selected from bentonite (e.g. ultra-fine bentonite), gypsum, lime such as hydrated lime, limestone, magnesite, magnesia, magnesium hydroxide, kaolin (e.g. high aspect ratio kaolin), talc (e.g. high aspect ratio talc), fibres, polyacrylamides, polyacrylates, starch, guar gum, dextrin, sodium lignosulfonates, sodium silicate, potassium silicate, lithium silicate, cement, geopolymers and resins (e.g. epoxy resin, acrylic resin).

34. The method of any of paragraphs 20 to 33, wherein the pellets do not comprise an organic binder.
35. The method of any of paragraphs 20 to 34, wherein the treated smectite clay is combined in a proportion that produces pellets having a total silica and alumina content equal to or less than about 8 wt %, for example equal to or less than about 2 wt %.
36. The method of any of paragraphs 20 to 34, wherein the treated smectite clay is combined in a proportion such that equal to or less than about 30 wt % of the total silica and alumina in the pellet is derived from the treated smectite clay.
37. The method of any of paragraphs 21 to 36, wherein the iron ore pellets have a green strength and/or a green drop number that is at least about 10% greater than the respective green strength and/or green drop number of iron ore pellets made without treating the smectite clay with a dispersant.
38. The method of any of paragraphs 20 to 37, wherein treating the smectite clay comprises mixing the dispersant with the smectite clay.
39. The method of paragraph 38, wherein the dispersant is in its dry form.
40. The method of paragraph 38 or 39, wherein the mixing occurs during milling of the smectite clay.
41. The method of any of paragraphs 20 to 40, wherein treating the smectite clay comprises applying a liquid composition comprising the dispersant to the smectite clay.
42. The method of paragraph 41, further comprising drying the smectite clay after the liquid composition has been applied.
43. The method of paragraph 41 or 42, wherein applying the liquid composition comprises spraying the liquid composition through nozzles.
44. The method of any of paragraphs 20 to 43, wherein treating the smectite clay with dispersant occurs at the same time as soda-ash activation of the smectite clay.
45. Pellets obtained by and/or obtainable by the method of any of paragraphs 20 to 44.
46. Iron ore pellets obtained by and/or obtainable by the method of any of paragraphs 21 to 45.
47. Use of iron ore pellets of paragraph 46 in the production of direct reduced iron or pig iron.
48. The use of paragraph 47, wherein the production of direct reduced iron or pig iron is in direct-reduction reactor or a blast furnace.
49. A composition for making pellets, the composition comprising a smectite clay that has been pre-treated with a dispersant and pellet-forming particles.
50. The composition of paragraph 49, wherein the smectite clay comprises bentonite.
51. The composition of paragraph 49 or 50, wherein the smectite clay comprises sodium bentonite such as sodium-activated bentonite or natural sodium bentonite.
52. The composition of any of paragraphs 49 to 51, wherein the smectite clay comprises equal to or less than about 40 wt % moisture.
53. The composition of any of paragraphs 49 to 52, wherein the smectite clay comprises equal to or greater than about 8 wt % moisture.
54. The composition of any of paragraphs 49 to 53, wherein the smectite clay comprises at least about 50 wt % smectite.
55. The composition of any of paragraphs 49 to 54, wherein the smectite clay that has been pre-treated with a dispersant has a dispersion volume that is at least about 5% greater than the dispersion volume of the smectite clay prior to treatment with the dispersant.
56. The composition of any of paragraphs 49 to 55, wherein the dispersant is an inorganic or organic dispersant.
57. The composition of any of paragraphs 49 to 56, wherein the dispersant is a sodium phosphate-type dispersant such as sodium hexametaphosphate, sodium tripolyphosphate, trisodium phosphate and sodium pyrophosphate.
58. The composition of any of paragraphs 49 to 57, wherein the dispersant is an acrylamide-type dispersant.
59. The composition of any of paragraphs 49 to 58, wherein the dispersant is present in the composition in an amount equal to or less than about 5 wt % based on the total weight of the smectite clay.
60. The composition of any of paragraphs 49 to 59, wherein the composition further comprises one or more further binders.
61. The composition of any of paragraph 60, wherein the one or more further binders are selected from bentonite (e.g. ultrafine bentonite), gypsum, lime such as hydrated lime, limestone, magnesite, magnesia, magnesium hydroxide, kaolin (e.g. high aspect ratio kaolin), talc (e.g. high aspect ratio talc), fibres, polyacrylamides, polyacrylates, starch, guar gum, dextrin, sodium lignosulfonates, sodium silicate, potassium silicate, lithium silicate, cement, geopolymers and resins (e.g. epoxy resin, acrylic resin).
62. The composition of any of paragraphs 49 to 61, wherein the composition does not comprise one or more organic binders.
63. The composition of any of paragraphs 49 to 62, wherein the composition comprises equal to or less than about 8 wt % total silica and alumina, for example equal to or less than about 2 wt % total silica and alumina.
64. The composition of any of paragraphs 49 to 63, wherein the treated smectite clay provides equal to or less than about 30 wt % of the total silica and alumina in the pellet.
65. The composition of any of paragraphs 49 to 64, wherein the pellet-forming particles are iron ore particles and the composition is for making iron ore pellets.
66. A smectite clay that has been treated with a dispersant, wherein the smectite clay can provide a green strength and/or a green drop number that is at least about 10% greater than the respective green strength and/or green drop number obtained with the smectite clay prior to treatment with the dispersant.
67. The smectite clay of paragraph 66, wherein the smectite clay comprises bentonite.
68. The smectite clay of paragraph 67, wherein the smectite clay comprises sodium bentonite such as sodium-activated bentonite or natural sodium bentonite.

69. The smectite clay of any of paragraphs 66 to 68, wherein the smectite clay comprises equal to or less than about 40 wt % moisture.
70. The smectite clay of any of paragraphs 66 to 69, wherein the smectite clay comprises equal to or greater than about 8 wt % moisture.
71. The smectite clay of any of paragraphs 66 to 70, wherein the smectite clay comprises at least about 50 wt % smectite.
72. The smectite clay of any of paragraphs 66 to 71, wherein the smectite clay that has been treated with a dispersant has a dispersion volume that is at least about 5% greater than the dispersion volume of the smectite clay prior to treatment with the dispersant.
73. The smectite clay of any of paragraphs 66 to 72, wherein the dispersant is an inorganic or organic dispersant.
74. The smectite clay of any of paragraphs 66 to 73, wherein the dispersant is a sodium phosphate-type dispersant such as sodium hexametaphosphate, sodium tripolyphosphate, trisodium phosphate and sodium pyrophosphate.
75. The smectite clay of any of paragraphs 66 to 74, wherein the dispersant is an acrylamide-type dispersant.
76. The smectite clay of any of paragraphs 66 to 75, wherein the dispersant is used in an amount equal to or less than about 5 wt % based on the total weight of the smectite clay.

The invention claimed is:

1. A method of pelletization, the method comprising:
treating a smectite clay with a dispersant selected from the group consisting of sodium hexametaphosphate, sodium tripolyphosphate, trisodium phosphate, and sodium pyrophosphate; and combining the treated smectite clay with pellet-forming particles to form iron ore pellets,
wherein the treated smectite clay binds the pellet-forming particles together.
2. The method of claim 1, wherein the smectite clay comprises bentonite.
3. The method of claim 1, wherein the smectite clay comprises equal to or less than about 40 wt % moisture or equal to or greater than about 8 wt % moisture.
4. The method of claim 1, wherein the dispersant is used in an amount equal to or less than about 5 wt % based on the total weight of the smectite clay.
5. The method of claim 1, wherein the pellets comprise equal to or less than about 8 wt % total silica and alumina.
6. The method of claim 1, wherein the iron ore pellets have a green strength and/or a green drop number that is at least about 10% greater than the respective green strength and/or green drop number of iron ore pellets made without treating the smectite clay with a dispersant.
7. The method of claim 1, wherein treating the smectite clay comprises mixing the dispersant with the smectite clay.
8. The method of claim 1, wherein treating the smectite clay comprises applying a liquid composition comprising the dispersant to the smectite clay.
9. The method of claim 1, wherein treating the smectite clay with dispersant occurs at the same time as soda-ash activation of the smectite clay.
10. Pellets obtained by and/or obtainable by the method of claim 1.
11. A composition for making iron ore pellets, the composition comprising a smectite clay that has been pre-treated with a dispersant comprising a phosphate salt selected from the group consisting of sodium hexametaphosphate, sodium tripolyphosphate, trisodium phosphate, and sodium pyrophosphate, and pellet-forming particles.
12. The composition of claim 11, wherein the smectite clay comprises bentonite.
13. The composition of claim 12, wherein the dispersant is present in an amount equal to or less than about 5 wt % based on the total weight of the smectite clay.
14. The composition of claim 13, wherein the pellets comprise equal to or less than about 8 wt % total silica and alumina.
15. The composition of claim 14, wherein the smectite clay comprises equal to or less than about 40 wt % moisture or equal to or greater than about 8 wt % moisture.

* * * * *